United States Patent [19]
Griner et al.

[11] 3,881,298
[45] May 6, 1975

[54] CARTONING APPARATUS

[75] Inventors: Arthur J. Griner, Delray Beach, Fla.; Robert J. Albrecht, River Edge, N.J.; V. H. Hoagland, Fair Lawn, N.J.; Daniel Ignatuk, Morris Plains, N.J.

[73] Assignee: Nabisco, Inc., New York, N.Y.

[22] Filed: May 28, 1974

[21] Appl. No.: 473,567

[52] U.S. Cl. ...................... 53/164; 53/61; 53/186; 214/6 F
[51] Int. Cl. ............................................ B65b 35/50
[58] Field of Search ...................... 53/164; 214/6 F

[56] References Cited
UNITED STATES PATENTS

| | | | |
|---|---|---|---|
| 2,924,051 | 2/1960 | More | 53/164 X |
| 3,473,289 | 10/1969 | Vadas | 53/164 X |

*Primary Examiner*—Travis S. McGehee
*Attorney, Agent, or Firm*—Gerald Durstewitz; I. A. Strombeck

[57] ABSTRACT

A column of articles to be cartoned are fed onto a table by an infeed conveyor. A transversely moving carriage carrying a pusher head moves a group of the articles across the table. One half of the articles in the group fall through an opening in the table onto a platform below. A stacking mechanism with pusher heads at the table and platform levels moves the two half groups of articles parallel to the conveyor to vertically align and position them in alignment with second and third pushers carried by the carriage. When the carriage transverses to move the group of articles away from the conveyor, the second and third pushers thereon move the stacked half groups into a carton carried by an intermittently driven conveyor.

5 Claims, 18 Drawing Figures

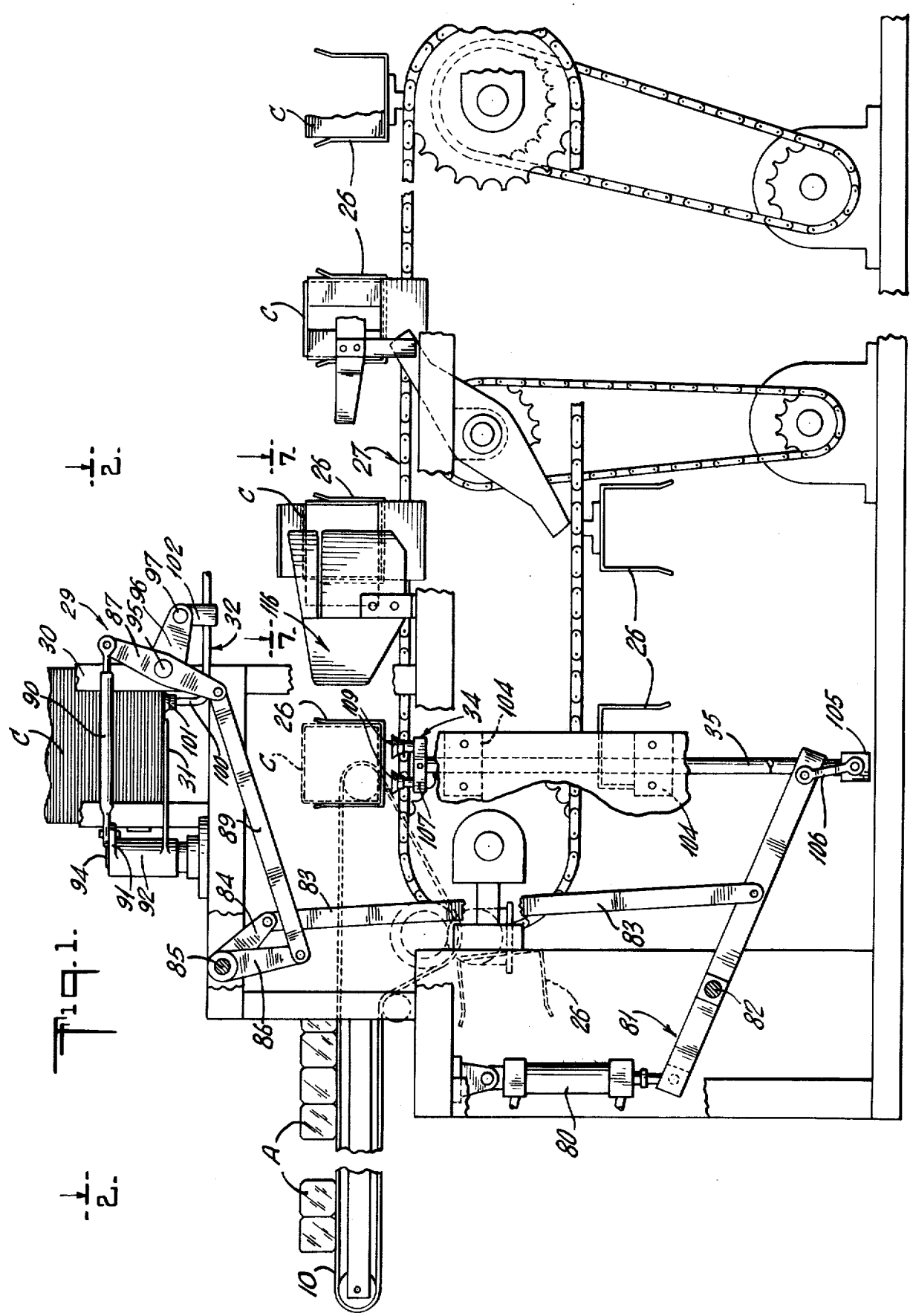

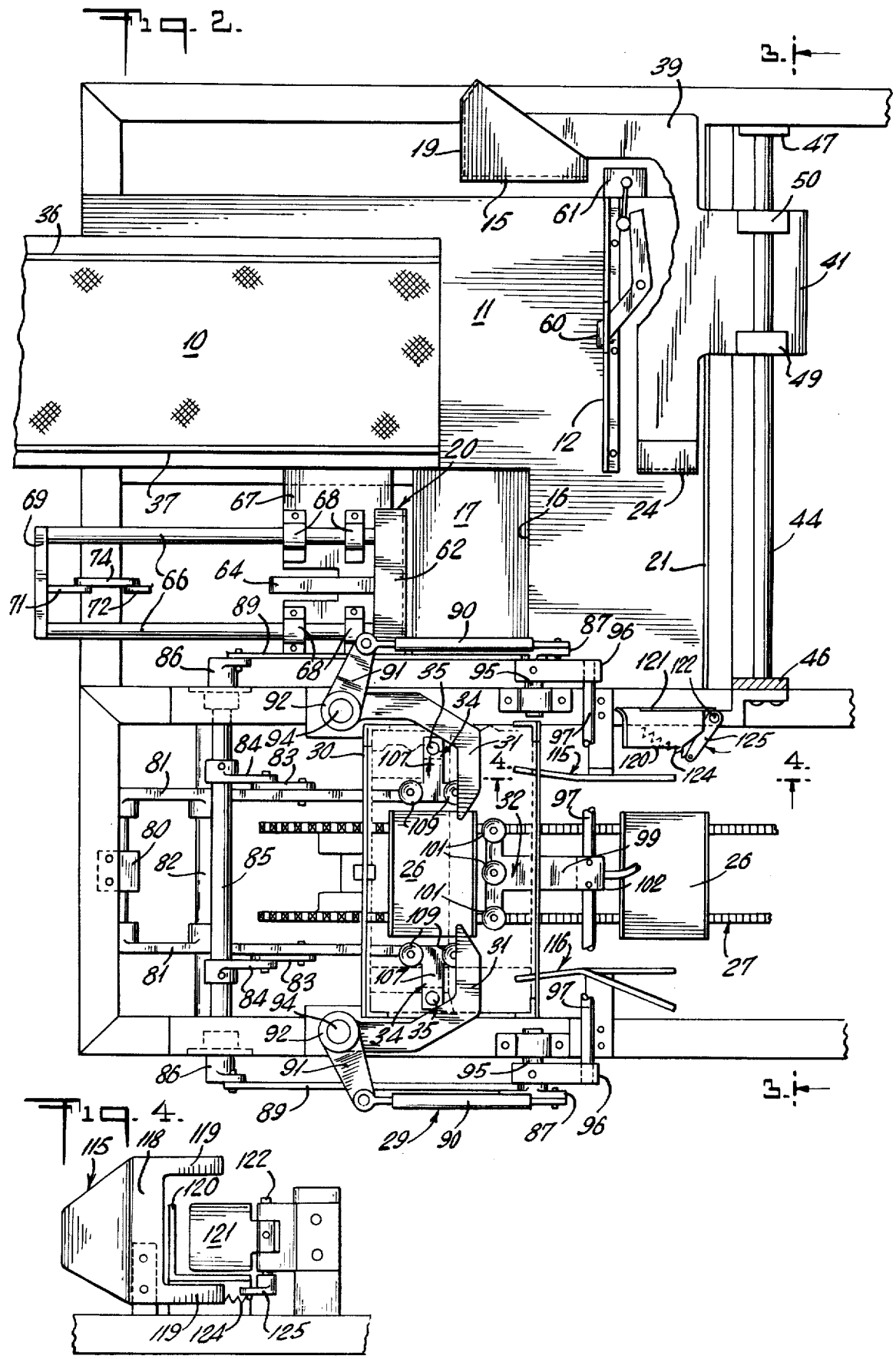

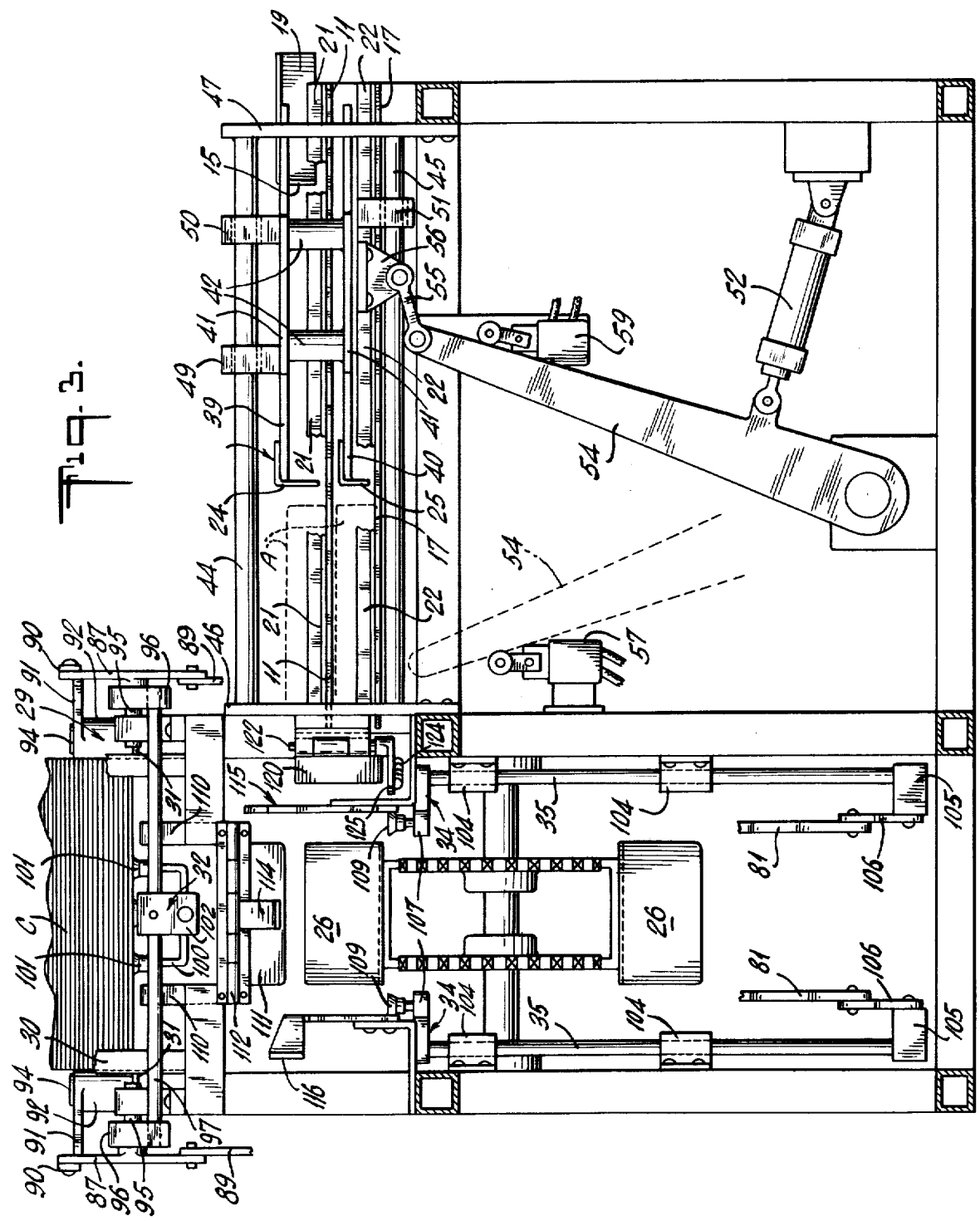

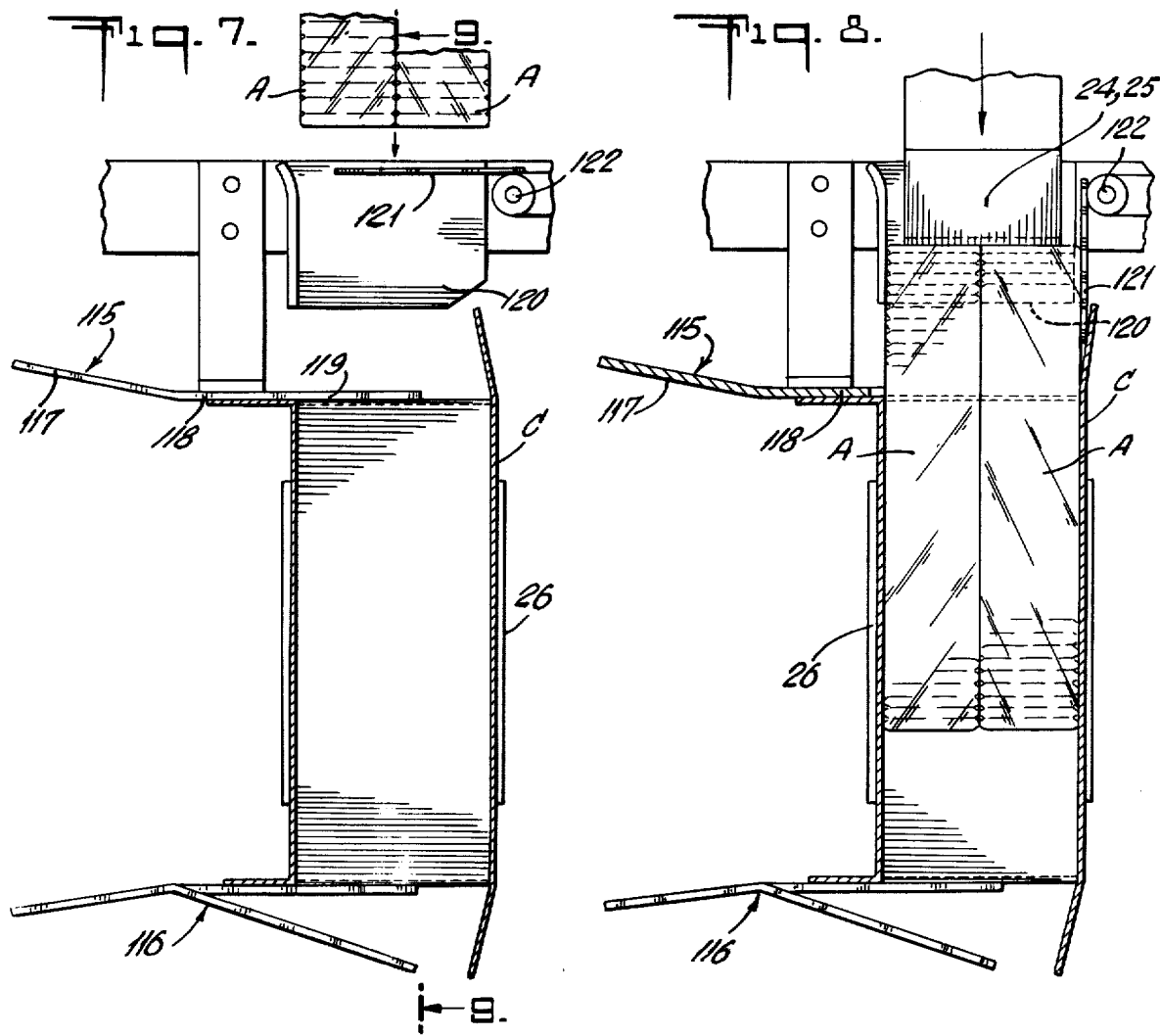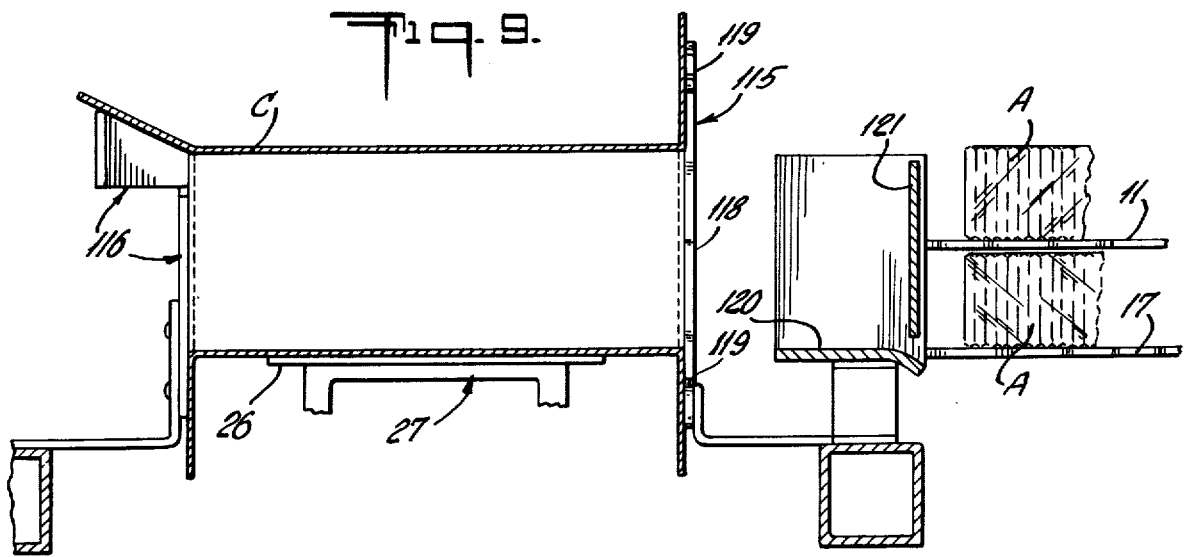

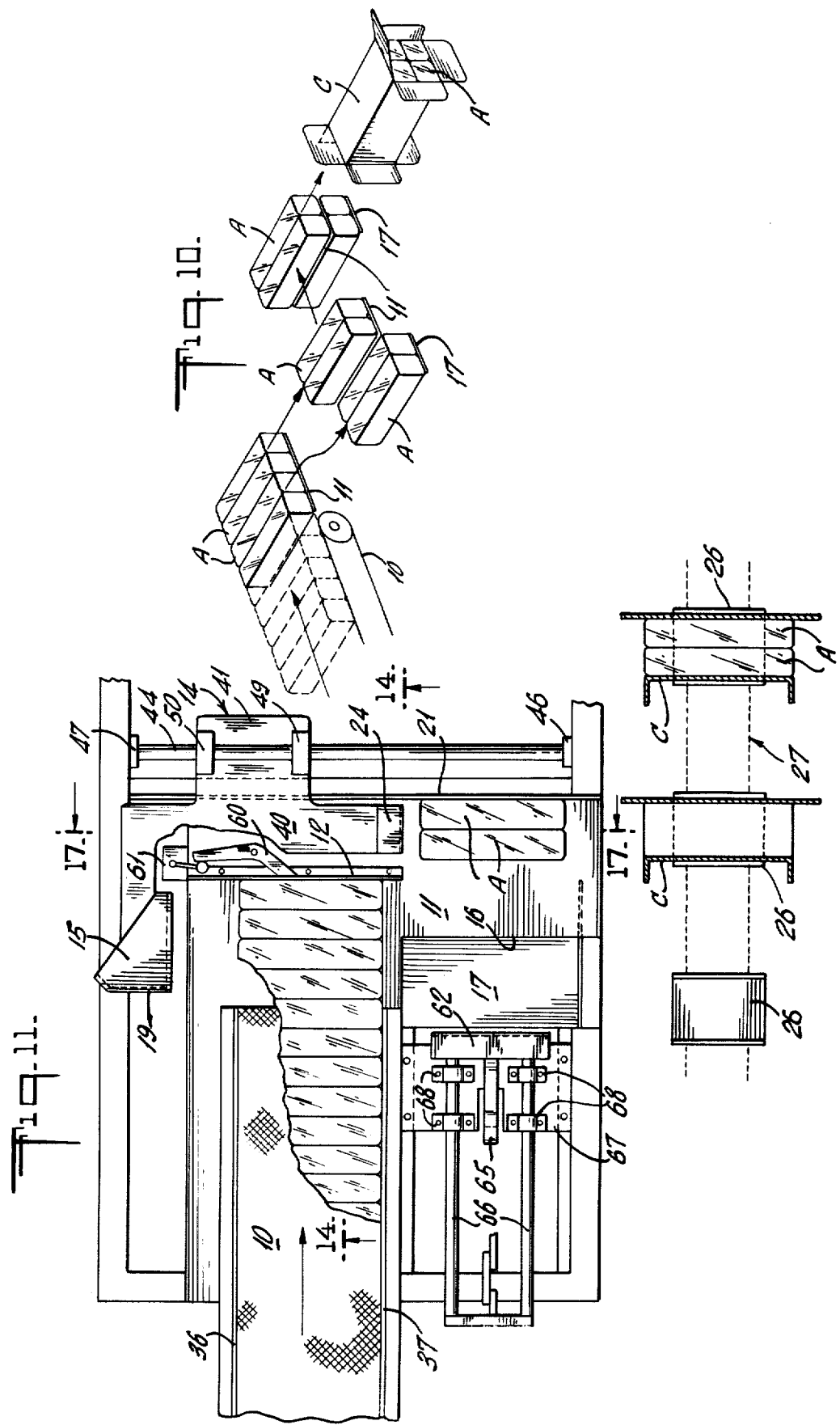

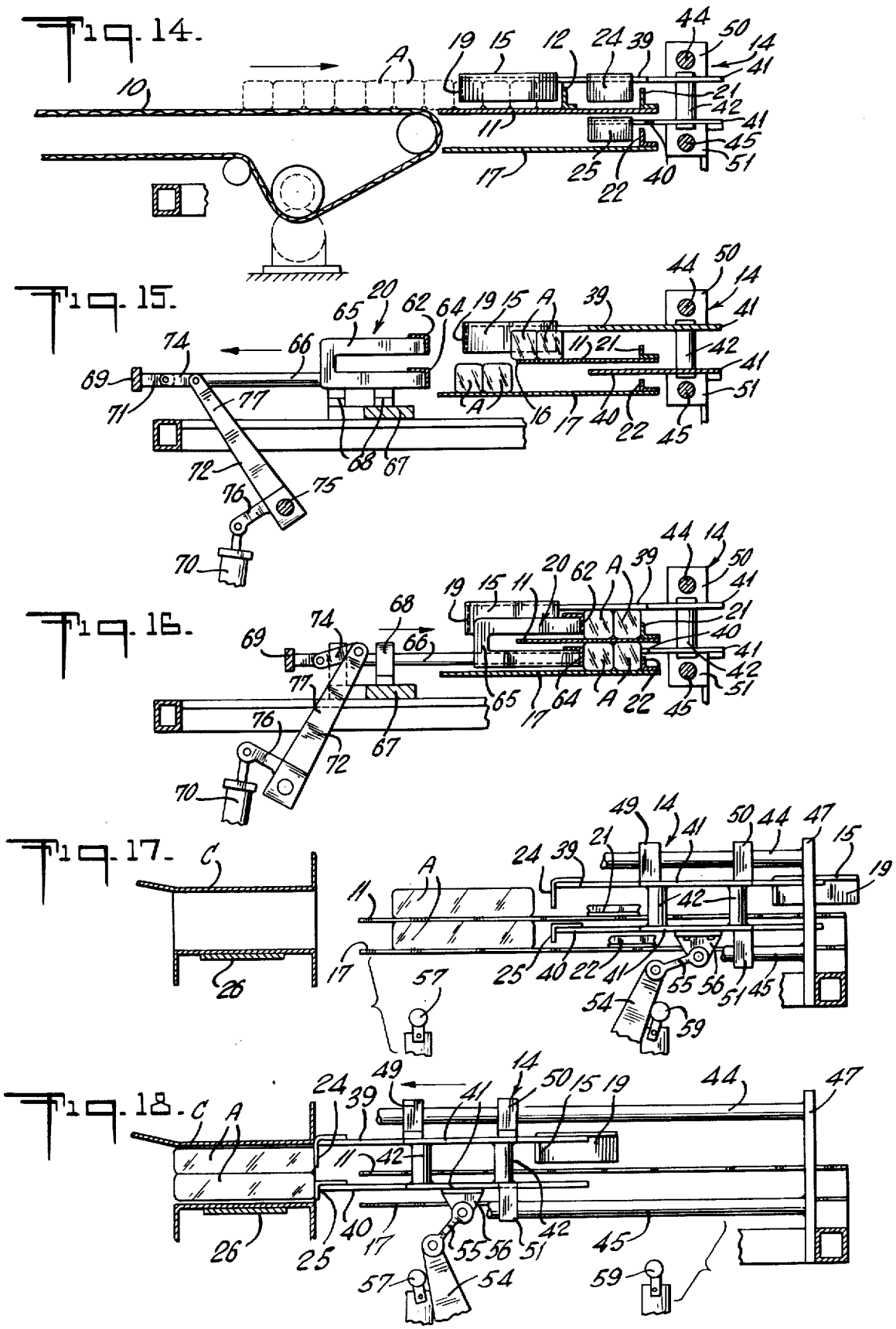

CARTONING APPARATUS

BACKGROUND OF THE INVENTION

The present invention relates to apparatus for loading articles into cartons, and, more particularly to such apparatus which stacks the articles prior to loading them into the cartons.

In the food industry, the band ovens used for baking cookies, crackers, and the like have been modified over the years to increase the rate of production of these baked goods. The length of the oven and the speed at which the band is driven have been increased, as have the width of the ovens, to increase the quantity of product flowing from the ovens in a unit of time. In order to keep pace with the output of these ovens, high speed packaging machinery has been developed so that a single machine can package the output of an oven. Such high speed machinery, however, because of its complexity and the rapid movement of its parts is, in general, more prone to malfunctioning than machinery which operates more slowly. When such a high speed packaging machine breaks down, the entire output of the oven must be stored until the machine is repaired. In production lines where the individual product pieces are stacked and wrapped to form slugs and a number of these slugs are packaged together in a single carton, there is no provision in the line for storing the slugs. The slugs therefore must be diverted from the line and dumped into storage bins and placed back on the line by hand when the packaging machine resumes operation. This procedure is undesirable and expensive because of the hand labor involved and because of the damage which the product sustains particularly during dumping.

Another disadvantage of using high speed machinery to package slug wrapped cookies and crackers is that the slugs are subjected to sudden changes in velocity which tend to damage the fragile individual product pieces.

It has been determined therefore that it is advantageous in the production of slug wrapped products to provide a plurality of packaging machines to handle the output of each oven. With a plurality of machines in use, they can be run at a slower speeds, and, if one machine malfunctions, the product flow can be redistributed by equipment in the line so that the functional machine share the flow normally directed to the non functional machine. In this way the need for dumping, storing and refeeding by hand is eliminated.

SUMMARY OF THE INVENTION

It is therefore an object of the present invention to provide improved cartoning apparatus which is compact, simple, reliable and relatively inexpensive.

Another object is to provide such apparatus for cartoning wrapped slugs in multiple level groups.

The foregoing objects are accomplished by providing cartoning apparatus which comprises infeed conveyor means for delivering a column of articles to a stop member, transversely moving pusher means for moving a group of articles from the column across a surface, a second surface beneath the first surface, means for depositing one half of the group of articles on the second surface, longitudinally moving pusher means for vertically aligning the two half groups of articles, and second transversely moving pusher means for moving the aligned articles into a carton.

BRIEF DESCRIPTION OF THE DRAWINGS

A preferred embodiment of the invention has been chosen for the purposes of illustration and description, and is shown in the accompanying drawings, forming a part of the specification, wherein.

FIG. 1 is an elevational view principally showing the carton erecting and transporting mechanism of the present invention.

FIG. 2 is a plane view of the present invention taken along the line 2—2 on FIG. 1.

FIG. 3 is an end elevational view taken along line 3—3 on FIG. 2.

FIG. 4 is an elevational view taken along line 4—4 on FIG. 2 showing the door arrangement through which articles are loaded into the cartons.

FIGS. 7 and 8 are sequential elevational views showing the loading of articles into a carton.

FIG. 9 is a sectional view taken along the line 9—9 on FIG. 7.

FIG. 10 is a schematic drawing illustrating the relative movement of articles during the operation of apparatus according to the present invention.

FIGS. 11, 12 and 13 are sequential plan views showing the operation of the article stacking and carton loading mechanisms.

FIG. 14 is a sectional view taken along the line 14—14 on FIG. 11.

FIG. 15 is a sectional view taken along the line 15—15 on FIG. 12.

FIG. 16 is a sectional view taken along the line 16—16 on FIG. 13.

FIG. 17 is a sectional view taken along the line 17—17 on FIG. 11.

FIG. 18 is a sectional view taken along the line 18—18 on FIG. 12.

DESCRIPTION OF THE PREFERRED EMBODIMENT

Figure 5:
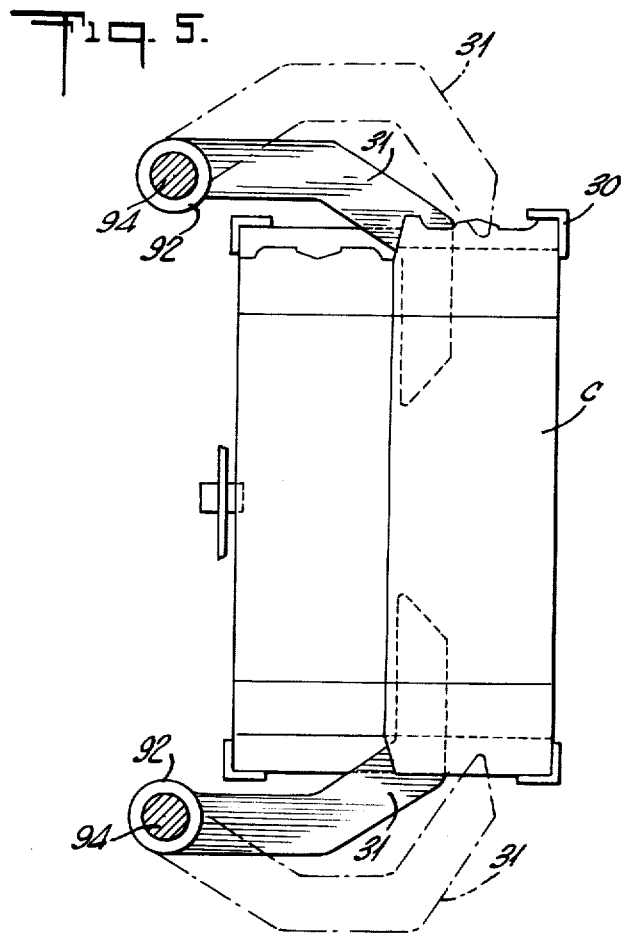
FIG. 5 is a plan view of a detail of the carton erecting mechanism.

Referring to the drawings in detail, and particularly to FIGS. 1-3, there is shown cartoning apparatus according to the present invention in which an infeed conveyor 10 transports article A to a table 11. The articles A each comprise a plurality of stacked crackers or the like which are wrapped in paper to form a slug. The surface of the table 11 is level with the top band of the conveyor so that each article reachng the end of the conveyor pushes the preceeding article along the surface of the table until (as shown in FIG. 11) a column of articles are positioned on the table between the end of the conveyor and a stop bar 12 secured to the top of the table.

Figure 12:
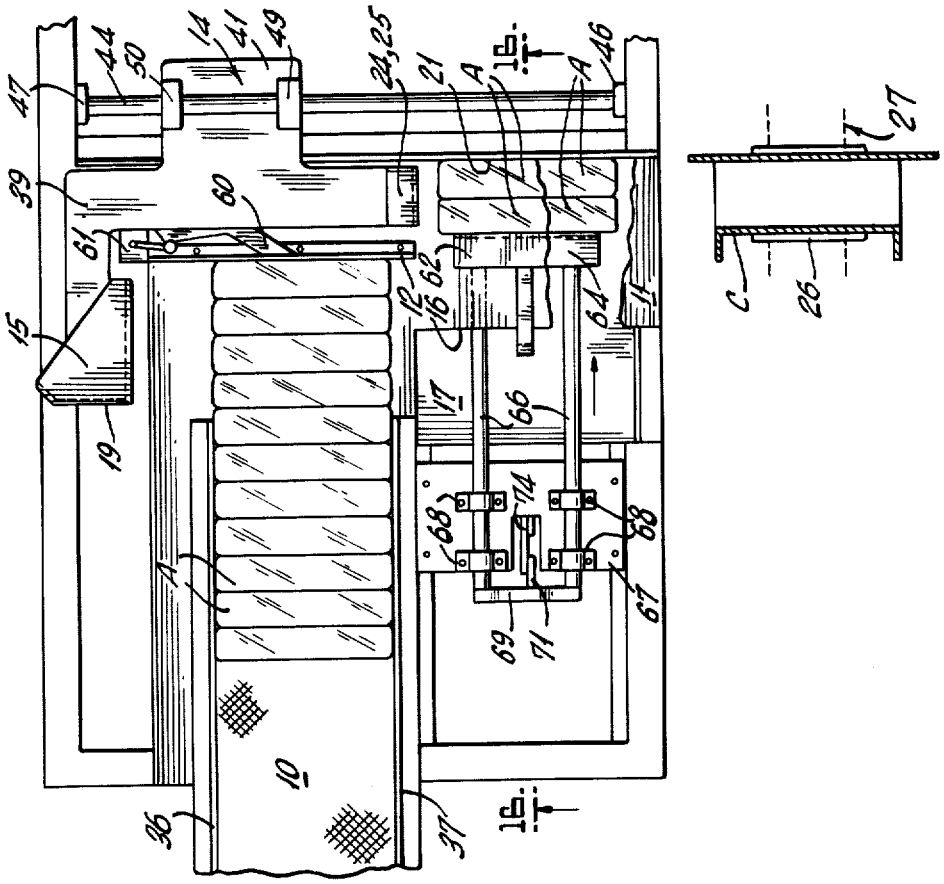
Figure 13:
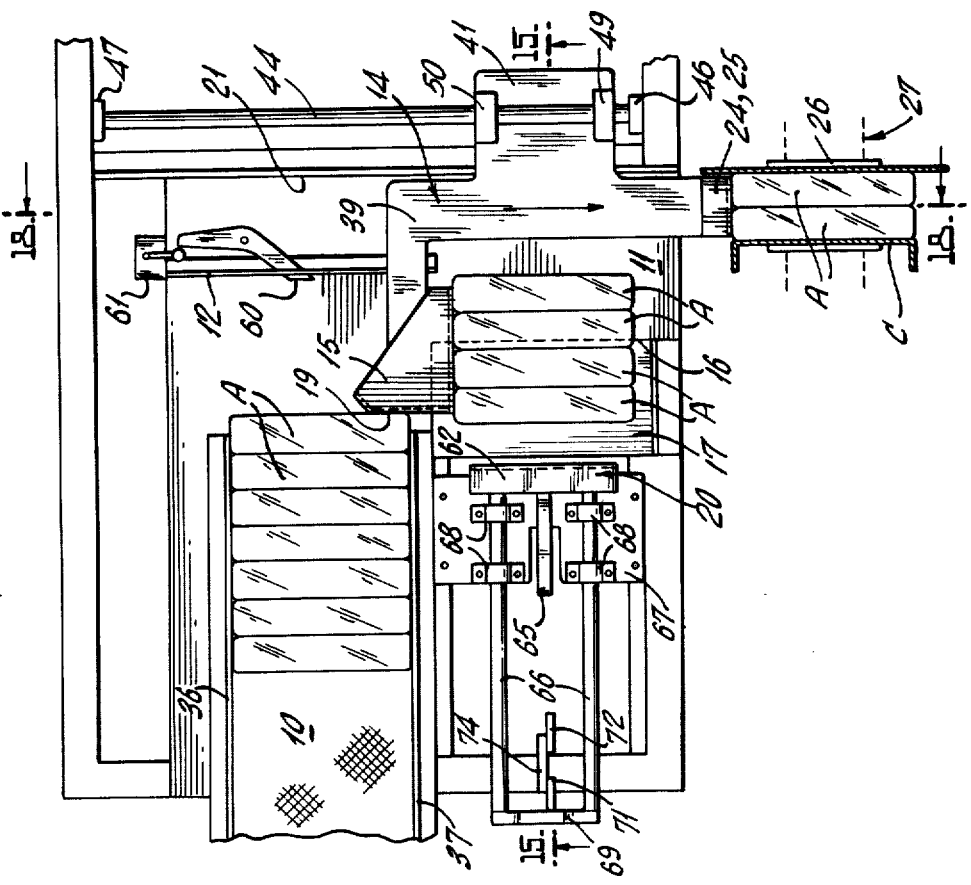

A pusher carriage 14 is mounted at the end of the table to move transversely with respect to the conveyor and carries a pusher head 15 for engaging a group of four articles A at the end of the column contacting the stop bar. As the carriage 14 moves transversely across the table, two of the four articles drop through an opening 16 in the table onto a plate 17 mounted beneath the table (as shown in FIGS. 10, 12 and 15). A side plate 19 on the pusher head 15 holds the column of articles (as shown in FIG. 12) until the carriage 14 returns to its original position. After the carriage has been retracted, a stacking pusher mechanism 20 slides the two packages on the table and the two packages on the plate 17 into vertical alignment against stop bars 21 and 22 (as shown in FIGS. 10, 13 and 16). While the stacking pusher 20 is operating, the articles on the conveyor advance to the stop bar thus placing another group of four articles in line with the pusher head 15. The stacking pusher retracts to its original position placing the cartoning apparatus in the condition shown in FIG. 11 with two articles on the table 11 in line with an upper loading pusher head 24 and two articles on the plate 17 in line with a lower loading pusher head 25 as shown in FIG. 17. As the carriage 14 moves transversely again the loading pusher heads 24 and 25 move the stacked articles, as shown in FIGS. 12 and 18, into a carton C carried in a bucket 26 on an intermittently driven bucket conveyor 27.

The cartons C are deposited in the buckets 26 of the conveyor 27 by a carton erecting mechanism 29 which receives folded carton blanks from a magazine 30.

Figure 6:
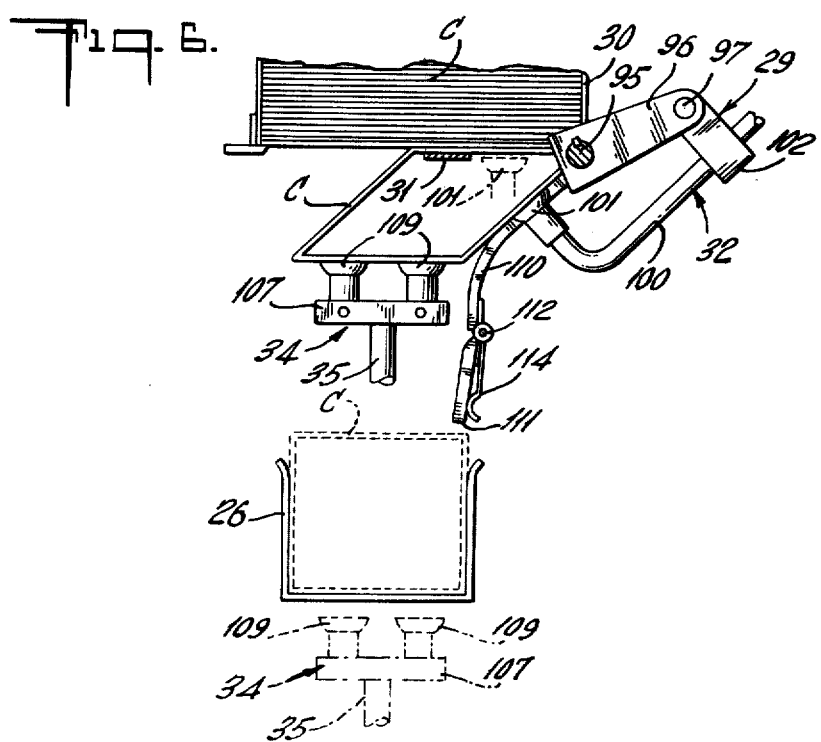
FIG. 6 is an elevational view of a detail of the carton erecting mechanism.

The carton erecting mechanism 29 includes a pair of pivoted flat arms 31 mounted at the bottom of the magazine 30 to enter into the bottom carton in the magazine as shown in FIGS. 5 and 6. Also mounted at the bottom of the magazine is a pivoted suction head 32 for unfolding the bottom carton while it is held in place by the arms 31. The carton is then engaged at each end by a reciprocating suction head 34 mounted on vertical rods 35. Upon engagement of the carton by the suction heads 34, the arms 31 rotate outwardly freeing the carton and the rods 35 are moved vertically downwardly to seat the carton in a bucket 26.

Along each side of the conveyor 11, a strip of angle iron is positioned to form side guides 36, 37 to hold the ends of the articles A parallel to the direction of travel of the conveyor so that they maintain their orientation as the articles are pushed across the table 11 to the stop bar 12.

The carriage 14 comprises horizontal upper and lower plates 39 and 40 each formed with an arm 41 extending past the edge of the table 11. A pair of spacers 42 extend vertically between the arms 41 to interconnect the two plates. The carriage is supported by two vertically aligned rods 44 and 45 extending horizontally between frame plates 46 and 47. The carriage is slideably mounted on the rods 44 and 45 by means of two bearing blocks 49 and 50 mounted on the top surface of the upper plate 39 and a bearing block 51 mounted on the bottom surface of the lower plate 40.

The carriage 14 is propelled by a hydraulic cylinder 52 through a lever arm 54 and a connecting rod 55 to a connecting block 56 mounted on the bottom surface of the lower plate 40. Electrical limit switches 57 and 59 are mounted to be operated by the lever arm 54 at each end of its stroke.

An lever 60 is pivoted on the table 11 and has one end extending through an opening in the stop bar 12 to be contacted by the articles A. The other end of the lever 60 engages the control arm of a switch 61.

The stacking pusher mechanism 20 includes an upper pusher head 62 and a lower pusher head 64. The upper head 62 is mounted at its center to a U-shaped bracket 65 which is attached to the center of the lower pusher head 64.

The lower pusher head 64 is supported by a pair of rods 66 attached to the ends thereof. The rods 66 are slideably mounted on a mounting plate 67 by means of bearing blocks 68. The other ends of the rods 66 are connected by a bar 69. The pusher mechanism 20 is actuated by a cylinder 70 which is connected to a flange 71 on to the bar 69 through a lever 72 and a link 74. The lever 72 is pivoted on a shaft 75 and has a short arm 76 connected to the cylinder and long arm 77 connected through the link 74 to the flange 71.

The carton erecting mechanism 29 is powered by a hydraulic cylinder 80 through a pair of levers 81 which are pivoted about a shaft 82. A rod 83 extends upwardly from each lever 81 to a pair of crank arms 84 mounted on a shaft 85. A second crank arm 86 is mounted on each end of the shaft 85 and these arms are each connected to one end of a lever 87 by a rod 89. The other ends of the levers 87 are connected by rods 90 to crank arms 91 formed on bushings 92 which are mounted on vertical shafts 94. The arms 31 are mounted on the bushings 92 to be moved between an operative and an inoperative position when the bushing is rotated. The levers 87 are pivoted on short horizontal shafts 95 on which arms 96 are mounted. The pivoted suction head 32 is mounted on a rod 97 which extends between the arms 96 and is keyed thereto. The suction head comprises a T-shaped manifold 99, three rigid tubes 100 extending perpendicularly to the manifold and three rubber cups 101 mounted to the end of the tubes for engaging the carton blanks. The manifold 99 is rigidly mounted to the rod 97 by means of a block 102.

The rods 35 supporting the suction heads 34 are mounted in bearing 104 for vertical movement. Blocks 105 are mounted on the bottom ends of the rods 35 and links 106 connect the blocks 105 to the ends of the levers 81. Each of the suction heads 34 include a T-shaped manifold 107 on which are mounted two cups 109.

When the cylinder 80 rotates the lever 81 counterclockwise (as viewed in FIG. 1), the arms 31 are rotated inwardly and enter the bottom most folded carton blank in the magazine 30 as shown in FIGS. 5 and 6. At the same time, the cups 101 of the suction head 32 are rotated downwardly to open the carton (which is held in place by the arms 31, as shown in FIG. 6) while the suction heads 34 move upwardly to engage the lower wall of the carton blank.

When the cylinder 80 rotates the lever 81 clockwise, the arms 31 rotate away from the carton blank and the suction heads 34 draw the opened blank down into a bucket 26. As best shown in FIGS. 3 and 6, a pair of curved brackets 110 extend downwardly from the rod 97 and a bar 111 is attached thereto by means of a piano type hinge 112. A spring finger 114 is positioned to tend to hold the bar 111 in the position shown in FIG. 6. The brackets 110 and the bar 111 act to square up the carton blank as it moves toward the bucket 26.

The carton is carried by the bucket past a pair of plow members 115 and 116 for positioning the end flaps of the cartons. The plow member 116 is of conventional design. The plow member 115 is positioned on the side of the bucket conveyor adjacent to the table 11 and (as shown in FIG. 4) includes a feed-in section 117, a vertical section 118 and horizontal fingers 119 extending from the ends of the section 118. The section 117 is tapered so that its upper and lower edges gradually bends the top and bottom end flaps of the carton into vertical positions. The section 18 holds the rear (or trailing) end flap of the carton at right angles to the rear panel of the carton (as shown in FIGS. 7 and 8) and the fingers 119 hold the top and bottom flaps in the vertical position (as shown in FIG. 9). As shown in FIGS. 2, 4, 7 and 8 a chute 120 is positioned at the edge of the table 11 to guide the articles A into the carton. The chute is provided with a door 121 mounted on a hinge 122 and is normally held in the closed position by a spring 124 connected to an arm 125. The arm 125 and the door 121 are both locked to the hinge pin of the hinge 122 to move together.

When a group of four stacked articles are moved against the door 121 by the carriage 14, the door swings inwardly as shown in FIG. 8 to allow the articles to slide freely into the carton. After the articles are positioned in the carton, the end flaps on each end of the carton are folded and sealed by conventional means.

It will be seen from the foregoing that the present invention provides improved cartoning apparatus which is compact, simple, reliable and relatively inexpensive.

We claim:

1. Cartoning apparatus comprising in combination an infeed conveyor carrying the articles to be cartoned, a stop member for positioning a column of articles delivered by the conveyor, a first transversely moving pusher for moving a group of articles from said column across a surface, a second surface beneath said first surface, means for depositing part of said group of articles onto said second surface, a longitudinally moving pusher for moving the articles of said group on said second surface into alignment with the articles of said group remaining on said first surface, and a second transversely moving pusher for simultaneously moving the aligned articles on both surfaces into a carton.

2. Cartoning apparatus according to claim 1 wherein said first surface is formed with an opening for receiving one half of said group as it is moved by said first transverse pusher.

3. Cartoning apparatus according to claim 2 wherein said first and second transverse pushers are longitudinally spaced and said longitudinal pusher moves the articles of said group on both surfaces into alignment with said second transverse pusher.

4. Cartoning apparatus according to claim 3 including a transversely moving carriage carrying said first and second transverse pushers.

5. Cartoning apparatus according to claim 4 wherein said carriage is moveable between a retracted position for allowing articles to be moved by the conveyor to said stop member and an extended position, and said first pusher is provided with a surface transverse to said conveyor for permitting articles to be advanced to said stop member only when said carriage is in its retracted position.

* * * * *